(12) United States Patent
Derenoncourt

(10) Patent No.: US 10,123,668 B2
(45) Date of Patent: Nov. 13, 2018

(54) PORTABLE TOILET

(71) Applicant: Franck Derenoncourt, Montreal (CA)

(72) Inventor: Franck Derenoncourt, Montreal (CA)

(73) Assignee: Franck Derenoncourt (CA)

( * ) Notice: Subject to any disclaimer, the term of this patent is extended or adjusted under 35 U.S.C. 154(b) by 0 days.

(21) Appl. No.: 15/619,446

(22) Filed: Jun. 10, 2017

(65) Prior Publication Data

US 2018/0084957 A1    Mar. 29, 2018

Related U.S. Application Data

(60) Provisional application No. 62/400,225, filed on Sep. 27, 2016.

(51) Int. Cl.
| | |
|---|---|
| *A47K 11/03* | (2006.01) |
| *A47K 11/02* | (2006.01) |
| *A47K 17/00* | (2006.01) |
| *E04H 1/12* | (2006.01) |
| *A47K 13/00* | (2006.01) |
| *A47K 13/24* | (2006.01) |

(52) U.S. Cl.
CPC ............. *A47K 11/02* (2013.01); *A47K 17/00* (2013.01); *E04H 1/1216* (2013.01); *A47K 13/00* (2013.01); *A47K 13/24* (2013.01)

(58) Field of Classification Search
CPC ......... A47K 11/02; A47K 13/00; A47K 17/00
USPC ........................................... 4/472, 471
See application file for complete search history.

(56) References Cited

U.S. PATENT DOCUMENTS

| | | | | |
|---|---|---|---|---|
| 2,817,092 | A * | 12/1957 | Hahn | E03D 7/00 4/254 |
| 6,668,391 | B1 * | 12/2003 | Lee | E03D 11/02 4/337 |
| 7,886,374 | B2 * | 2/2011 | Jun | E03D 5/012 4/324 |
| 9,145,668 | B2 * | 9/2015 | Molina | E03D 11/13 |
| 2008/0063991 | A1 * | 3/2008 | Sifers | F23G 7/07 431/5 |
| 2012/0066826 | A1 * | 3/2012 | Molina | E03D 11/18 4/434 |

\* cited by examiner

*Primary Examiner* — Huyen Le

(57) ABSTRACT

A portable toilet (100) comprises a reservoir (110), a reservoir cover (120) adjustably fixed on the top of the reservoir (110) and a drawer (210) inside the reservoir (110). Further, the reservoir cover (120) is having a hole (130), first cavity (140) and a second cavity (150). Further, the reservoir (110) is adapted to receive human waste from the hole (130) provided on the reservoir cover (120). Further, the drawer (210) contains a handle (220), the handle (210) is capable of moving in the first cavity (140) of the reservoir cover (120) and consequently move the drawer (210) inside the reservoir (110) from a first position to a second position. Further, the movement of the drawer (210) blocks a view of the human waste inside the reservoir (110) through the hole (130), while entering into a toilet cabin (160).

14 Claims, 13 Drawing Sheets

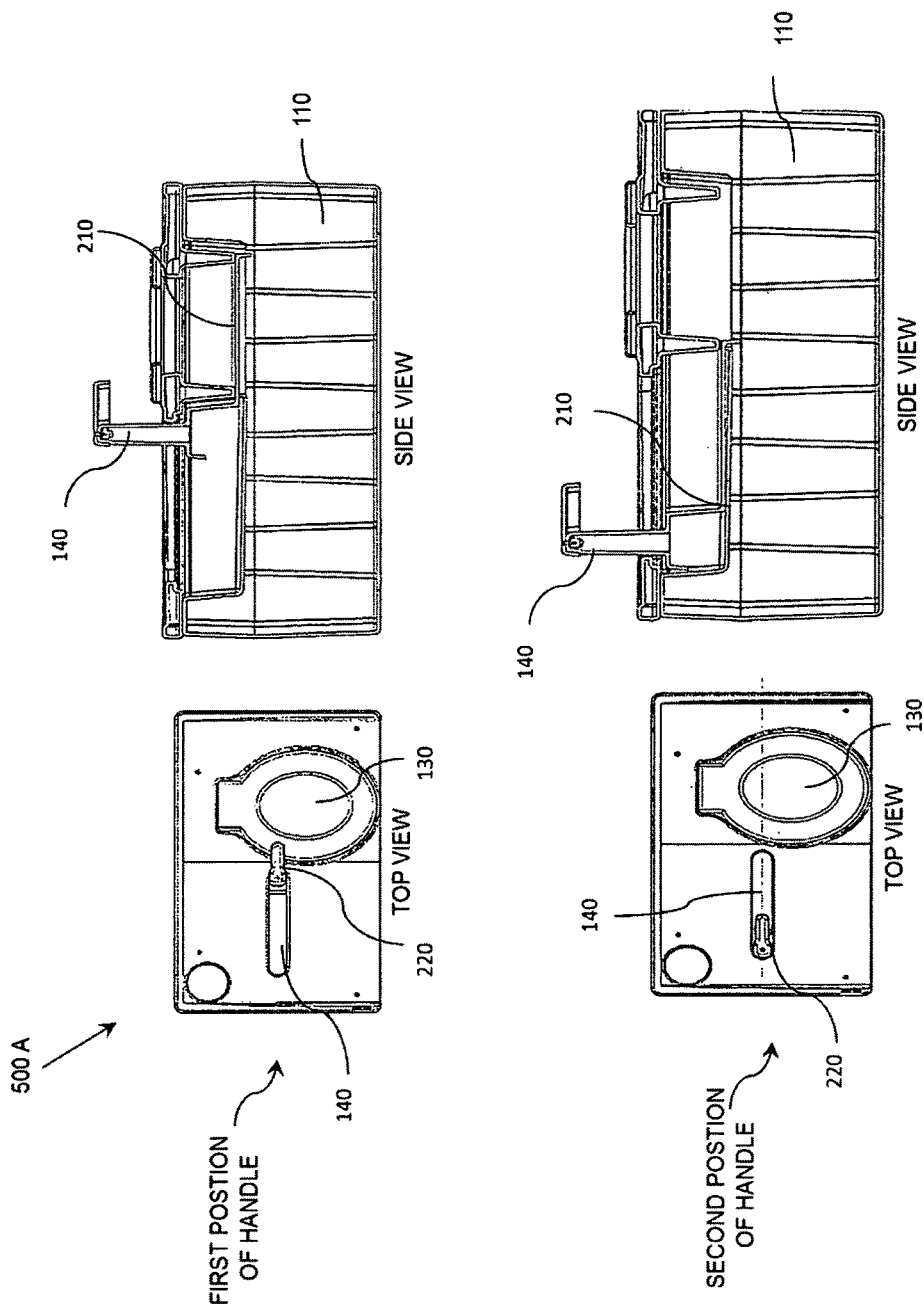

PORTABLE TOILET

CROSS-REFERENCE TO RELATED APPLICATION

This application claims the benefit of U.S. Provisional Application No. 62/400,225, filed on Sep. 27, 2016.

TECHNICAL FIELD

The present invention relates generally to the field of toilets, and more specifically to a portable toilet.

BACKGROUND

A toilet is a sanitation fixture used for storing and/or disposal of human waste. In developed countries, ceramic toilets seats are commonly used and are mainly usually used in the western countries. While squat toilets are common in East Asia and/or developing countries.

In many developing countries, especially in rural areas, portable toilets and dry toilets such as pit latrines and composting toilets are used. Dry toilets are usually placed in outhouses or in a remote location near a house. Further, the portable toilets are commonly used at construction sites, parks, outdoor recreational events, and wherever toilets are needed for a limited time period only or where sanitary sewers are unavailable.

Further, for a temporary settlement, the portable toilets are installed on the rear chassis and/or on the attachment chassis of trucks and/or Lorries. A regular cleanup and maintenance of these portable toilets are required that consumes lot of water and human resource. Further, the water is already available in scarcity and thus need to be avoided.

Further, the problem that exists with portable toilets is that while making entry into the toilet cabin, the human waste stored in the human waste reservoir is visible through the hole of the toilet which makes a very inconvenient moment for the user. Further, the open toilet hole spreads the smell of the human waste inside the toilet cabin that makes a very unhygienic environment for the person inside the cabin. Further, flies and mosquito tend to accumulate near the human waste reservoir which further can spread a disease.

Further, for providing a comfortable environment in portable toilet, chemicals are used for disinfecting the waste storage tank and reducing lingering smell of the human waste. The problem with disinfecting chemicals is that they are very harmful for the environment and even difficult to dispose.

Several inventors have worked on the same problem and some works of the inventors are discussed below:

The document U.S. Pat. No. 9,493,937B2 discloses a portable toilet that contains a filter which separates the solid waste and liquid waste in separate containers for solid and liquid waste. The collected waste is collected in plastic bags and used for useful purposes such as manure and/or compost.

The document US 20160143492 A1 provides a portable toilet system having a foldable toilet that is configured to hold a disposable bag in it. Further, the system includes a collapsible enclosure that can be positioned over the toilet to provide privacy for the user.

However, the problem of toilet spreading the smell through the open center hole of toilet, poor ventilation system inside the toilet cabin needs to be improved. Further, improvements are required to provide better hygienic, healthy and comfortable conditions inside the toilet cabin.

In light of the discussion above, there is clearly a need in the art for a better portable toilet that does not suffer from the above mentioned deficiencies.

SUMMARY

Embodiments of the present invention aim to provide a portable toilet. The present invention includes a mechanism for blocking the view of the toilet hole. Further, a ventilation system is provided in the present invention that directs the bad smell of human waste out of a toilet cabin. Further, the portable toilet does not use water for flushing out the human waste. In the present invention there is no requirement of using harmful chemical for disinfecting the human waste. Further, a comfortable and hygienic environment is provided inside a toilet cabin without lingering smell.

The present invention further includes an overflow control system that allows does not allows human waste to overflow from the toilet hole and spread inside the toilet cabin. Further, an innovative flushing system is provided to control the overflow of portable toilet. Further, in the present invention, the portable toilet is used for clearing both urinal and solid human waste.

According to first aspect of the present invention, a portable toilet is disclosed. A portable toilet comprises a reservoir, a reservoir cover adjustably fixed on the top of the reservoir and a drawer inside the reservoir. Further, the reservoir cover is having a hole, a first cavity and a second cavity. Further, the reservoir is adapted to receive human waste from the hole provided on the reservoir cover. Further, the drawer contains a handle which is capable of moving in the first cavity of the reservoir cover and consequently moving the drawer inside the reservoir from a first position to a second position. Further, the movement of the drawer blocks a view of the human waste inside the reservoir through the hole. Further, the second cavity is having an exhaust pipe connected to a roof of the toilet cabin, adapted to provide ventilation inside the reservoir and capable of directing the bad smell of the human waste out of the toilet cabin.

In accordance with embodiment of the invention, the reservoir further comprises a shielding plate capable of blocking the view of the human waste inside the reservoir through the first cavity.

In accordance with embodiment of the invention, the reservoir cover further comprises one or more sections protruding downward along the periphery of the hole of the portable toilet.

In accordance with embodiment of the invention, the one or more sections are capable of blocking the view of the human waste reservoir through the hole of the portable toilet.

In accordance with embodiment of the invention, the one or more sections is capable of sweeping accidental spill of the human waste on the drawer and drop the human waste in the reservoir when the drawer is moved from the first position to the second position.

In accordance with embodiment of the invention, the reservoir cover further comprises a depression around the periphery of hole, capable of holding a seat cover of the portable toilet.

In accordance with embodiment of the invention, the seat cover is capable of accommodating a user on the seat cover.

In accordance with embodiment of the invention, the drawer is provided with a sliding mechanism capable of moving the drawer from the first position to the second position.

In accordance with embodiment of the invention, in the first position, the drawer is below the hole and in the second position the drawer is below the first cavity.

In accordance with embodiment of the invention, the portable toilet further comprises drawer and handle assembly on either side of the hole.

In accordance with embodiment of the invention, the reservoir further comprises an extended stair portion adapted to further increase the capacity of reservoir.

In accordance with embodiment of the invention, the portable toilet further comprises an exhaust fan connected to the exhaust pipe.

In accordance with embodiment of the invention, the portable toilet further comprises a plurality of sensors capable of sensing the user inside the toilet cabin.

In accordance with embodiment of the invention, the plurality of sensors is adapted to switch on the exhaust fan on sensing the user inside the toilet cabin.

In accordance with embodiment of the invention, a human waste overflow control system in a reservoir comprises a drain pipe connected on one side to the reservoir outlet and on another side with an underground tank. Further, the drain pipe is having a reverse U-shaped bend in between the reservoir and the underground tank, near the reservoir. Further, the reverse U-shaped bend is having a lever capable of tilting the reverse U-shaped bend to an angle of 90 degree about a horizontal axis of the drain pipe. Further, the tilting of the U-shaped bend at an angle of 90 degree allows the movement of the human waste from the reservoir to the underground tank.

In accordance with embodiment of the invention, the reservoir is having a bottom surface, provided with a slope inclining toward the reservoir outlet.

In accordance with embodiment of the invention, a level of reservoir is higher than that of the underground tank.

In accordance with embodiment of the invention, the drain pipe is provided with a slope adapted to facilitate flow of the human waste into the underground tank.

In accordance with embodiment of the invention, the underground tank is selected from the group of, a sewage tank, a composting infrastructure and an underground dumping site.

In accordance with embodiment of the invention, the system is capable of flushing out the human waste from the reservoir and is independent of size of the reservoir.

In accordance with embodiment of the invention, the system is capable of connecting with the outlet of modern toilet having availability of water and is adapted to flush out of the human waste.

In accordance with embodiment of the invention, the system is capable of flushing out the human waste from the toilet in, but not limited to, 15 seconds.

BRIEF DESCRIPTION OF THE ACCOMPANYING DRAWINGS

So that the manner in which the above recited features of the present disclosure can be understood in detail, a more particular description of the disclosure is illustrated in the appended drawings. It is to be noted, however, that the appended drawings illustrate only typical embodiments of the disclosure and are therefore not to be considered limiting in scope, as the disclosure may support other equally effective embodiments.

These and other features, benefits, and advantages of the present disclosure will become apparent by reference to the following figures, with like reference numbers referring to like structures across the views, wherein:

FIG. 5A illustrates different positions of a handle of a drawer, in accordance with embodiment of the invention;

DETAILED DESCRIPTION OF THE PREFERRED EMBODIMENTS

Figure 1:
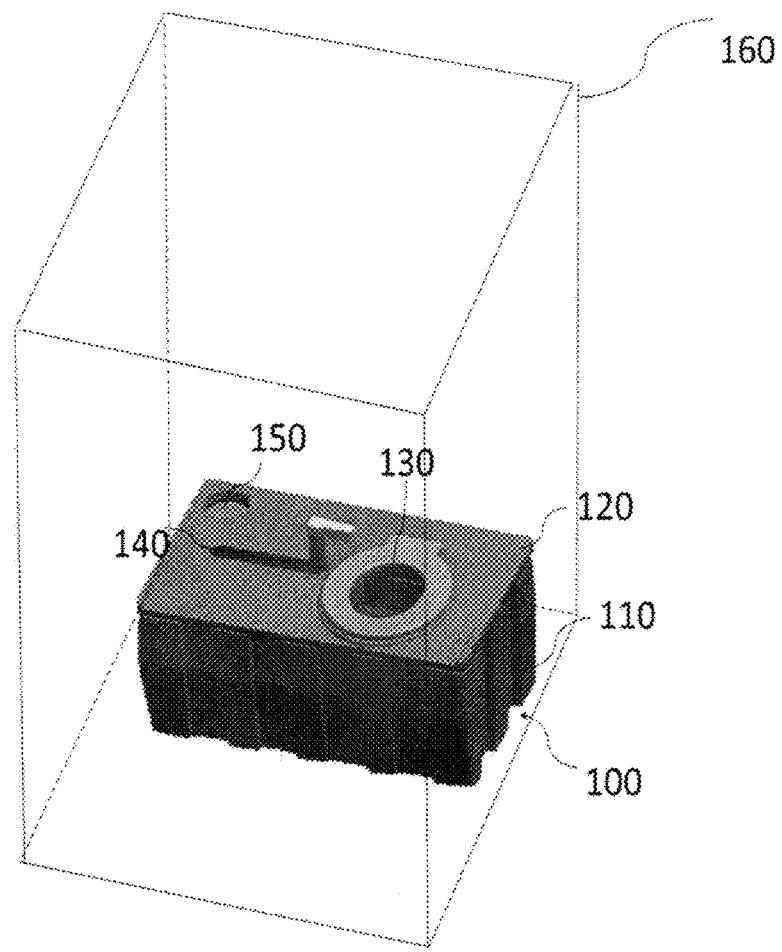
FIG. 1 illustrates a perspective view of a portable toilet, in accordance with an embodiment of the present disclosure.

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "two or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including"

or "containing" for applicable legal purposes. Any discussion of documents, acts, materials, devices, articles and the like is included in the specification solely for the purpose of providing a context for the present disclosure. It is not suggested or represented that any or all of these matters form part of the prior art base or were common general knowledge in the field relevant to the present disclosure.

The present disclosure is described hereinafter by various embodiments with reference to the accompanying drawing, wherein reference numerals used in the accompanying drawing correspond to the like elements throughout the description. This disclosure may, however, be embodied in many different forms and should not be construed as limited to the embodiment set forth herein. Rather, the embodiment is provided so that this disclosure will be thorough and complete and will fully convey the scope of the disclosure to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the disclosure.

Referring to the drawings, the invention will now be described in more detail. FIG. 1 illustrates a perspective view of a portable toilet (100) in a toilet cabin (160), in accordance with an embodiment of the invention. As shown in FIG. 1, the portable toilet (100), comprises a reservoir (110) and a reservoir cover (120). Further, the reservoir cover (120) is having a hole (130), a first cavity (140) and a second cavity (150). In one embodiment of the invention, the reservoir (110) is made up of a thermoplastic material. Thermoplastic material has advantage of being light in weight, easy to carry and hardened enough to carry a required weight. Further, an outer surface of the reservoir (110) is corrugated to provide extra rigidity to the reservoir (110). The reservoir (110) is made up of translucent material such that the quantity of material carried by the reservoir can be judged from outside such that the cleaning of the reservoir (110) can be done In accordance with an embodiment of the invention, the reservoir (110) is made by molding process, preferably the reservoir (110) is made up by blow molding process. Further, the reservoir cover (120) is made up of same material as that of the reservoir (110). Further, the reservoir (110) is adapted to receive human waste from the hole (130) provided on the reservoir cover (120). The reservoir cover (120) is adjustably fixed on the reservoir (110). Further, for fixing the reservoir cover (120) with the reservoir suitable means are used. The suitable means are selected from, but are not limited to screws, rivets, press-studs etc.

Figure 2:
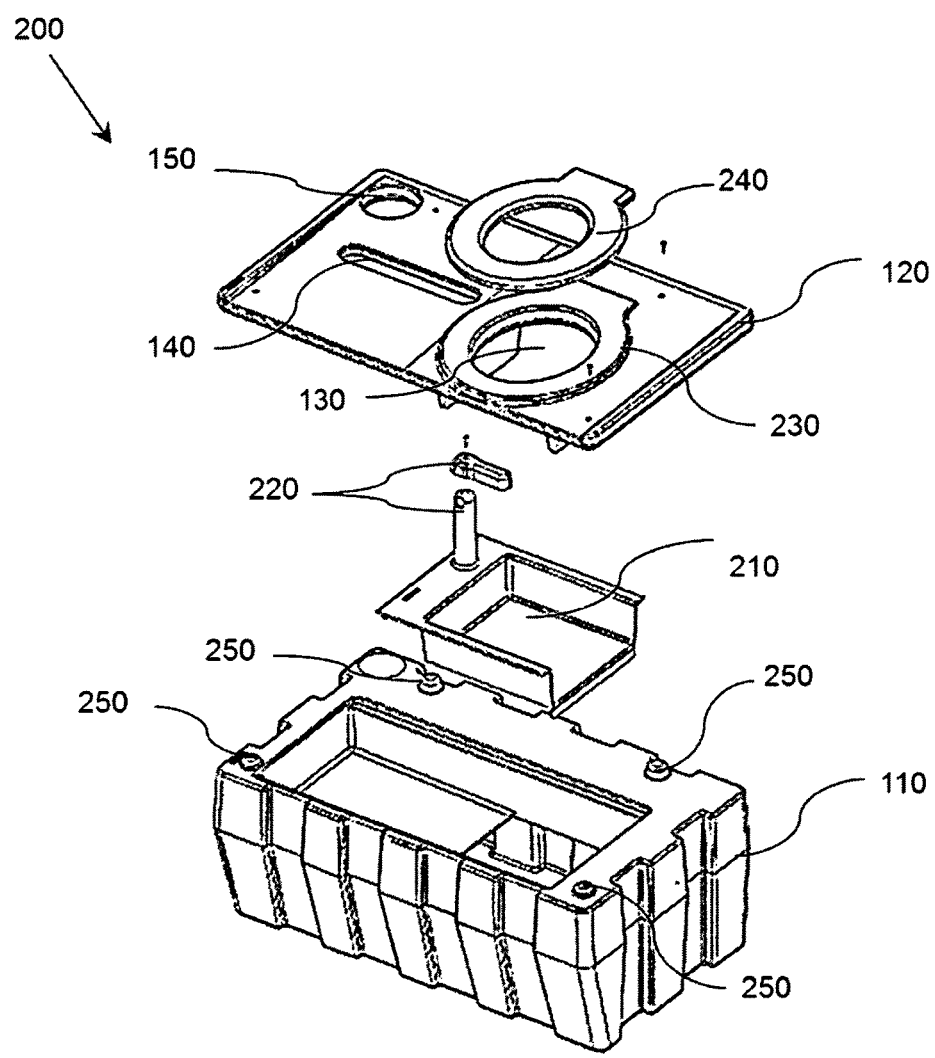
FIG. 2 illustrates an exploded view of the portable toilet, in accordance with an embodiment of the present disclosure.

FIG. 2 illustrates an exploded view (200) of portable toilet (100), in accordance with embodiment of the invention. As shown in FIG. 2, the reservoir (110) comprises a plurality of anchorage points (250), capable of fixing the reservoir cover (120) with reservoir (110). In the preferred embodiment, the reservoir cover (120) is fixed with the reservoir (110) by providing screws of suitable size on the reservoir cover (120) and inserting in the anchorage points (250) provided on the reservoir (110).

In accordance with embodiment of the invention, the reservoir cover (120) further comprises a depression (230) around the periphery of hole (130) capable of holding a seat cover (240) of the portable toilet (100). Further, the seat cover (240) is capable of accommodating a user on the seat cover (240).

Figure 3:
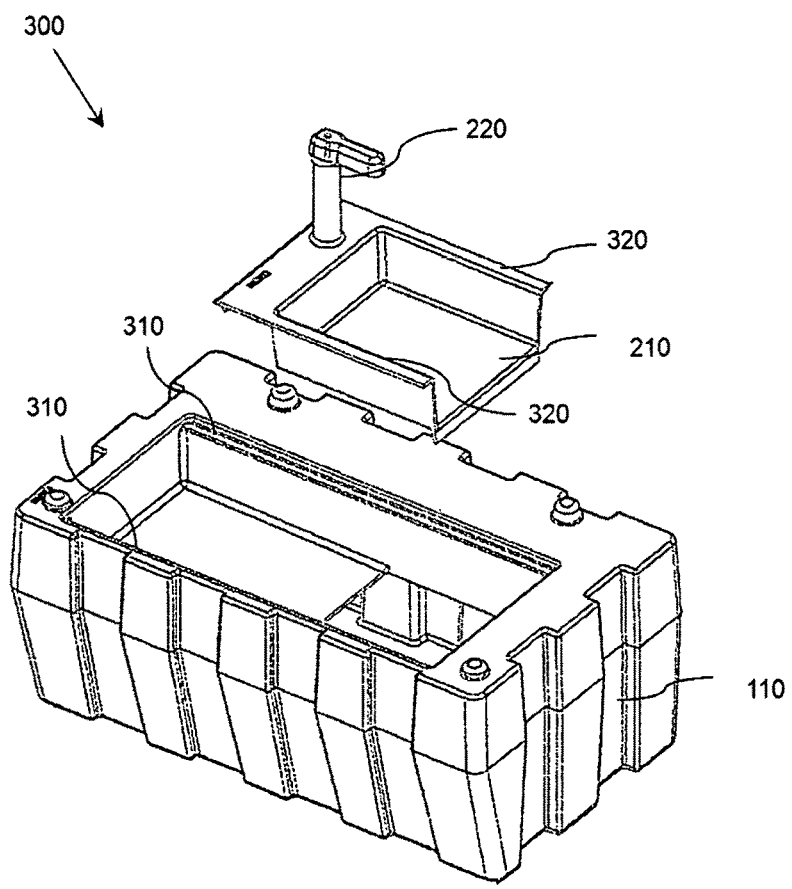
FIG. 3 illustrates a perspective view of the reservoir, in accordance with embodiment of the invention.

As shown in FIG. 2, the portable toilet (100) further comprises a drawer (210) and a handle (220) assembly. Further, the drawer (210) is inside the reservoir (110) and the handle (220) is capable of moving in the first cavity (140) of the reservoir cover (120) and consequently moves the drawer (210) inside the reservoir (110) from a first position to a second position. Further, at first position, the drawer (210) is below the hole (130). At second position the drawer (210) is below the first cavity (140). In one embodiment of the invention, the handle (220) is rigidly attached with the drawer (220) that is, when handle is moved in one direction, the drawer (200) also moves in the same direction. Further, the drawer (210) is provided inclination that allows the liquid waste to drop into the reservoir (110). In accordance with an embodiment of the invention, the drawer (210) is provided a sliding mechanism capable of moving the drawer (210) from the first position to the second position. FIG. 3 illustrates a perspective view (300) of the reservoir (110), in accordance with embodiment of the invention. As shown in FIG. 3, the reservoir (110) comprises two longitudinal channels (310) adapted to slide wings (320) of the drawer (210) on the channels (310). Further, the drawer (210) is free is move on the channels (310), without any interference from the seat cover (240). In accordance with one embodiment of the invention, the sliding mechanism is one of, but not limited to ball bearing channel, rail and channel, rack and pinion.

Figure 4:
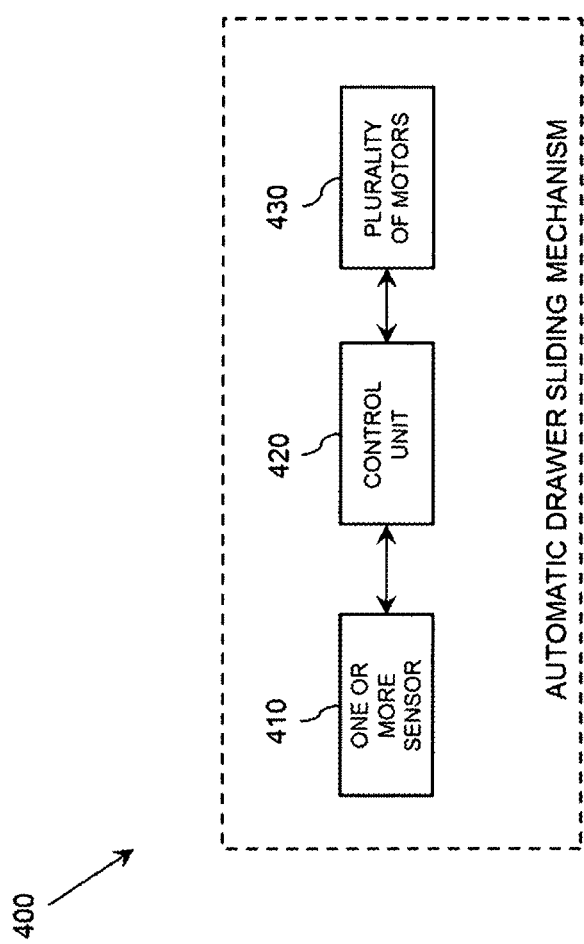
FIG. 4 illustrates a logical diagram of automatic drawer sliding mechanism, in accordance with embodiment of the invention.

The sliding mechanism of the drawer (210) and handle (220) assembly may be automated in some embodiment as will be discussed below. FIG. 4 illustrates a logical diagram of an automatic drawer sliding mechanism (400), in accordance with embodiment of the invention. As shown in FIG. 4, the automatic drawer sliding mechanism (400) includes one or more sensors (410), a control unit (420) and a plurality of motors (430). Further, the one or more sensor (410) is a proximity sensor. Further, the one or more sensors (410) sense the presence of the user on the seat cover (240) of the portable toilet (100). If the user is sitting on the seat cover (240), the one or more sensor (410) sends a signal to the control unit (420). The control unit (420) actuates the plurality of motors (430). Further, the plurality of motors (430) slides the drawer from first position to second position. Further, as and when user lifts from the seat cover (240) of the portable toilet (160), the one or more sensors (410) senses it and further actuates the plurality of motors (430) through control panel (420), to move the drawer from second position to first position. Further, the automatic drawer sliding mechanism (400) is powered using rechargeable battery only.

FIG. 5A illustrates the different positions (500A) of the handle (220) of drawer (210), in accordance with embodiment of the invention. As shown in FIG. 5A, the drawer (210) is below the hole (130), when handle (220) is at first position. In the second position the drawer (210) is below the first cavity (140). In accordance with embodiment of the invention, the movement of the drawer (210) blocks a view of the human waste inside the reservoir (110) through the hole (130), while entering into a toilet cabin. The drawer (220) is under the hole (130) that is at first position when user enters the toilet cabin (160).

Further, the portable toilet (100) is adapted to receive human waste. The human waste includes liquid waste in form of urine and solid waste. For males, the default position for clearing the liquid waste is standing position and for clearing solid waste the default position is sitting position. Further, the female users have a default position as sitting position for removal of liquid waste as well as solid waste. Therefore, two positions of handle (220) are provided in the portable toilet (100), as shown in FIG. 4. Further, the default position of the handle (220) is the first position that is, the drawer (210) being under the hole (130). Further, when the user enters the toilet cabin, no view of human waste is seen through the hole (130) by the user as the drawer (210) is under the hole (130). Further, for male user entering the toilet cabin for urinal only. Then, the male user can straight away use the portable toilet (100) without changing the position of the drawer (210). Further, for male user entering the toilet cabin (160) for solid waste removal only and for the female user. The user needs to shift the position of handle (220) from first position to second position that moves the drawer (210) from under the hole (130) to under the first cavity (140).

Figure 5B:
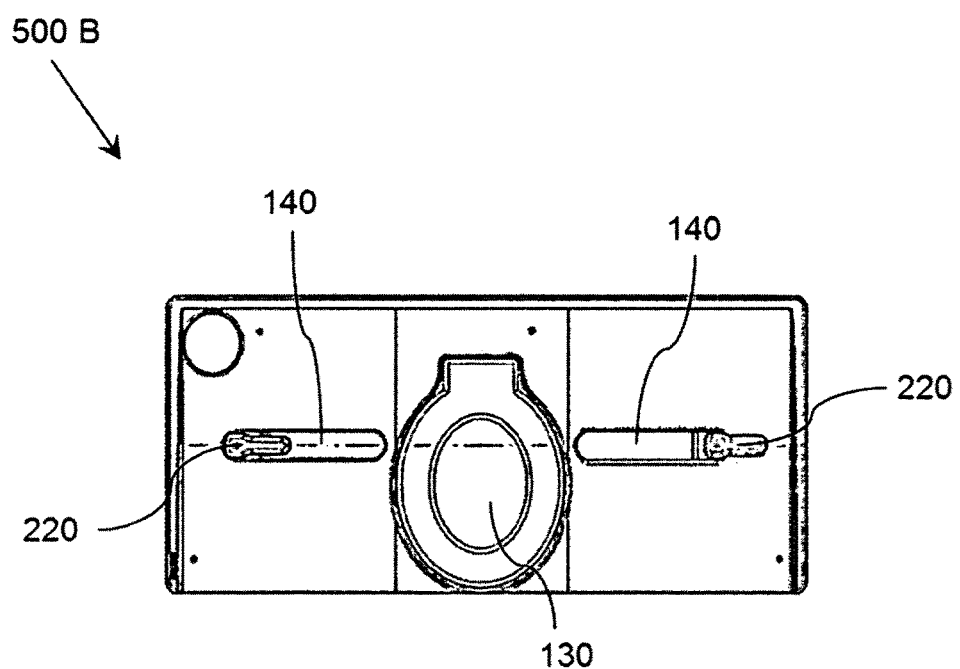
FIG. 5B illustrates a top view of portable toilet, in accordance with embodiment of the invention

In accordance with one embodiment of the invention, the portable toilet (100) is having drawer (210) and handle (220) assembly on both side of the hole (130). FIG. 5B illustrates a top view (500B) of portable toilet (100), in accordance with embodiment of the invention. As shown in FIG. 5B, the drawer (210) and handle (220) assembly is provided on both side of the hole (130) of portable toilet (100).

Figure 6:
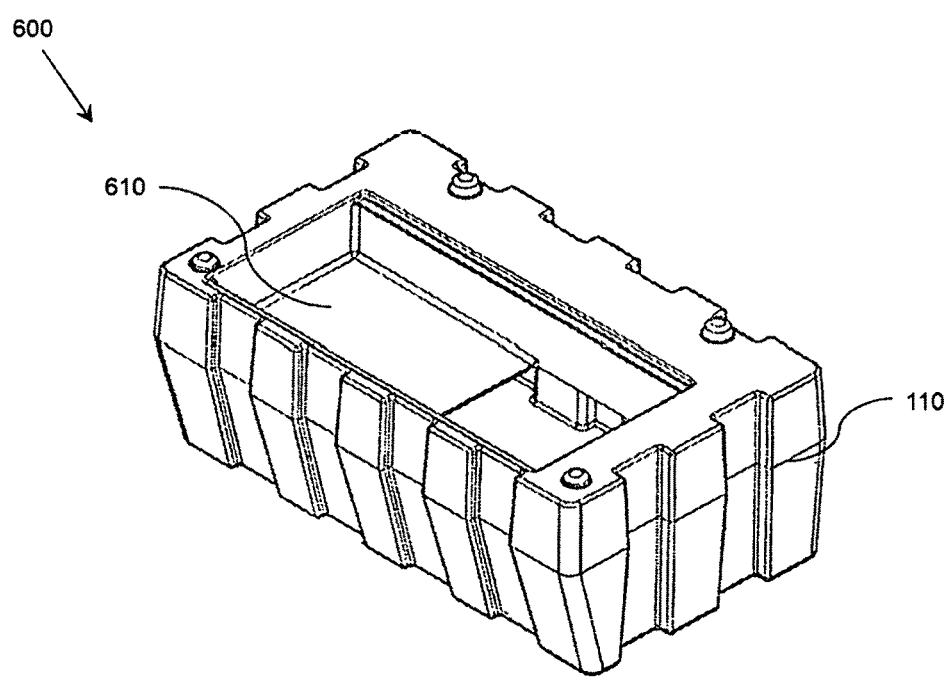
FIG. 6 illustrates a perspective view of the reservoir, in accordance with an embodiment of the invention.

FIG. 6 illustrates a perspective view (600) of the reservoir (110), in accordance with an embodiment of the invention. As shown in FIG. 6, the reservoir (110) further comprises a shielding plate (610) capable of blocking the view of the human waste inside the reservoir (110) through the first cavity (140). Therefore, while entering into the toilet cabin (160), no view of the human waste is provided from the first cavity (140) as a shielding plate (610) is provided under the first cavity (140). Further, in the second position of handle (220), the drawer (210) is in between the first cavity (140) and the shielding plate (610).

In accordance with embodiment of the invention, the second cavity (150) is having an exhaust pipe (not shown in figures) connected to a roof of the toilet cabin (160), adapted to provide a ventilation inside the reservoir (110) and capable of directing the bad smell of the human waste out of the toilet cabin (160). Further, the exhaust pipe is connected on one side to the reservoir (110) at second cavity (150) and other side connected with roof of the toilet cabin (160) and left open to atmosphere. Further, a ventilation system described above provides a comfortable environment inside the toilet cabin (160).

Figure 7:
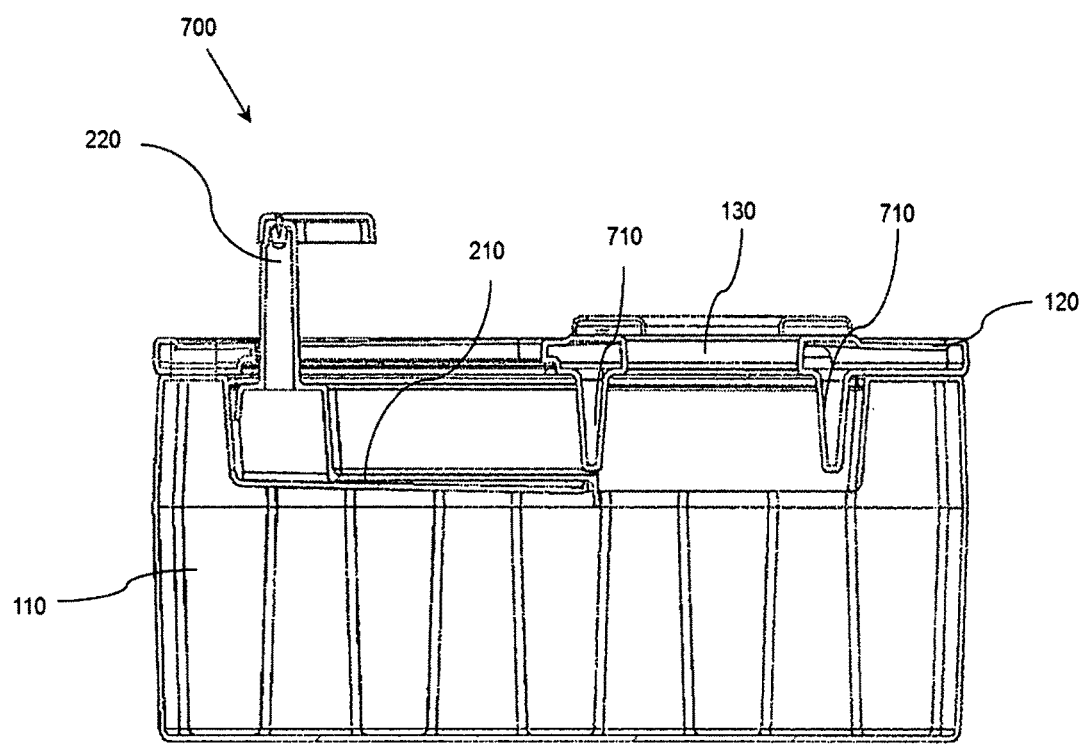
FIG. 7 illustrates a side view of an assembly of the reservoir and the reservoir cover the reservoir, in accordance with embodiment of the invention.

FIG. 7 illustrates a side view (700) of an assembly of the reservoir (110) and the reservoir cover (120), in accordance with embodiment of the invention. As shown in FIG. 6, the reservoir cover (120) further comprises one or more sections (710) protruding downward along the periphery of the hole (130) of the portable toilet (100). Further, the one or more sections (710) are capable of further blocking the view of the human waste in reservoir through the hole (130) of the portable toilet (100). The one or more sections (710) touch the drawer (210), when drawer (210) is under the hole (130). Further, the one or more sections (710) sweep accidental spill of the solid human waste on the drawer (210) and drops the solid human waste in the reservoir (110) when the drawer (210) is moved from the first position to the second position.

Figure 8:
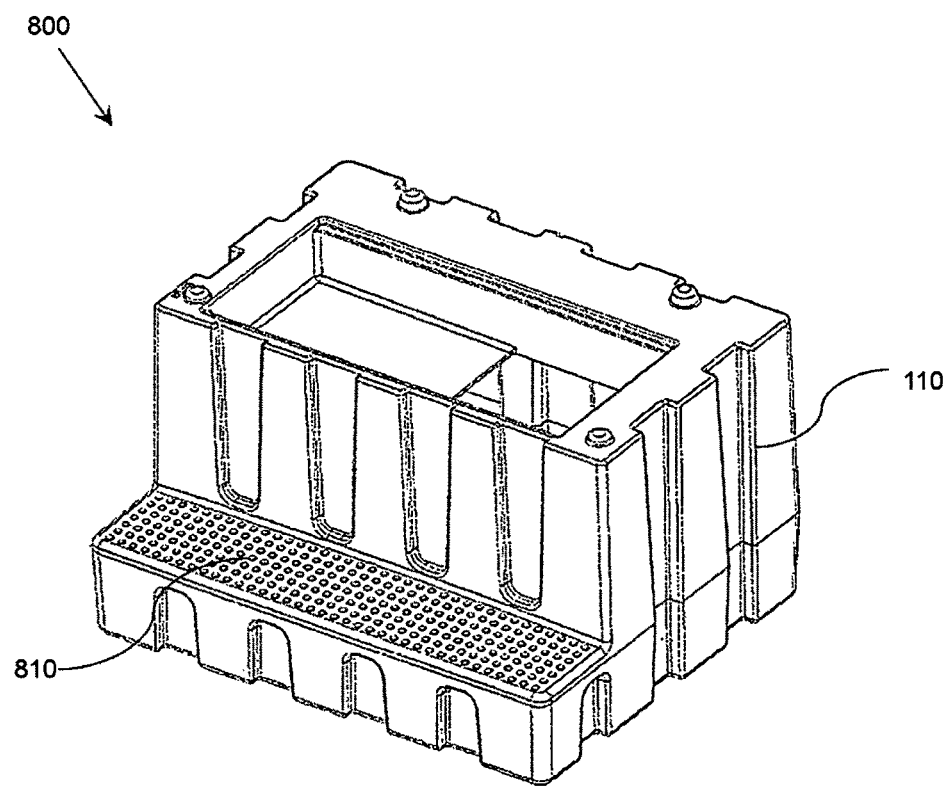
FIG. 8 illustrates a perspective view of the reservoir, in accordance with an embodiment of the invention.

FIG. 8, illustrates a perspective view (800) of the reservoir (110), in accordance with an embodiment of the invention. As shown in FIG. 7, the reservoir (110) further comprises an extended stair portion (810) adapted to increase the capacity of reservoir (110). Further, the extended stair portion (810) is provided as an inbuilt part of the reservoir. Further, the extended stair portion (810) allows a user to keep feet on the extended stair portion (810), when the user is sitting on the hole (130) of the portable toilet (100).

In accordance with another embodiment of the invention, the portable toilet further comprises solar panels (not shown in figures) and a rechargeable battery (not shown in figures) on the roof of the toilet cabin (160). Further, the rechargeable battery is capable of storing energy accumulated by the solar panels.

In accordance with another embodiment of the invention, the ventilation system of the toilet cabin (160) further includes an exhaust fan (not shown in figures) capable of creating a negative pressure inside the reservoir (160). The negative pressure directs the air inside the reservoir (160) through the exhaust pipe and releases it in the open atmosphere. Further, the exhaust fan is powered using the energy stored in the rechargeable battery.

In one embodiment of the invention, the ventilation system is connected with door of the toilet cabin (160) that allows the exhaust fan to automatically start when the user is inside the toilet cabin (160) and turns off when the user lefts the toilet cabin (160). Further, the portable toilet (160) includes a plurality of sensors fixed on the toilet cabin door that senses the presence of the user inside the toilet cabin (160). Further, the plurality of sensors is adapted to switch on the exhaust fan on sensing the user inside the toilet cabin. Further, one of the sensors is a proximity sensor.

In one embodiment of invention, the energy required to power the exhaust fan and sensor is provided using the energy stored in rechargeable battery through solar panels. In one embodiment of the invention, the energy is provided using (Alternating Current) AC power source.

Figure 9:
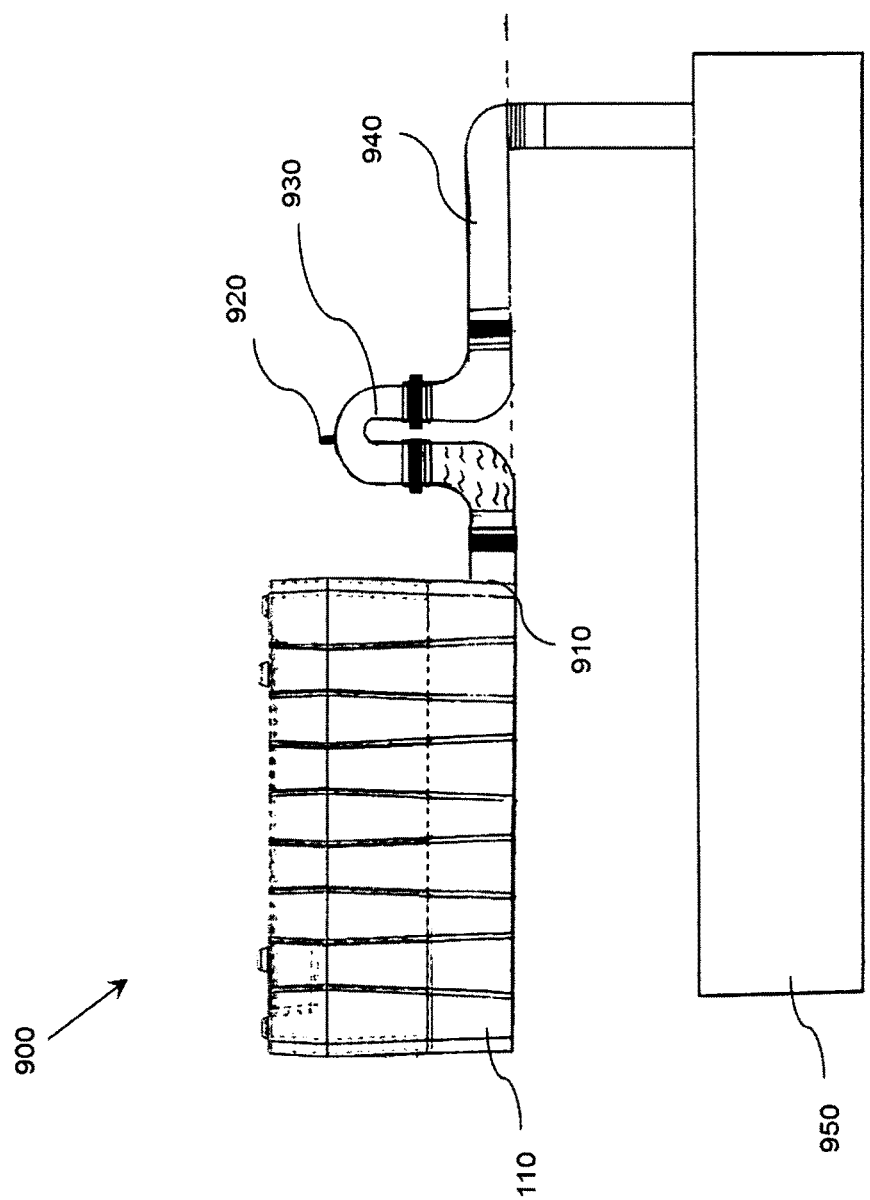
FIG. 9 illustrates a side view of human waste over flow control system, in accordance with an embodiment of the invention.

In one embodiment of the invention, the portable toilet (100) is provided with a human waste over flow control system (900). FIG. 9 illustrates a side view of human waste over flow control system (900), in accordance with an embodiment of the invention. As shown in FIG. 9, the human waste over flow control system (900) comprises a drain pipe (940) connected on one side to the outlet (910) of reservoir (110) and on the other side with an underground tank (950). In accordance with embodiment of the invention, a bottom surface of the reservoir (110) is provided a slope inclining toward the outlet (910) of the reservoir (110) that moves the human waste towards the outlet (910) of the reservoir (110). Further, the drain pipe (940) is having a reverse U-shaped bend (930) in between the reservoir (110) and the underground tank (950), near the reservoir (110).

Figure 10:
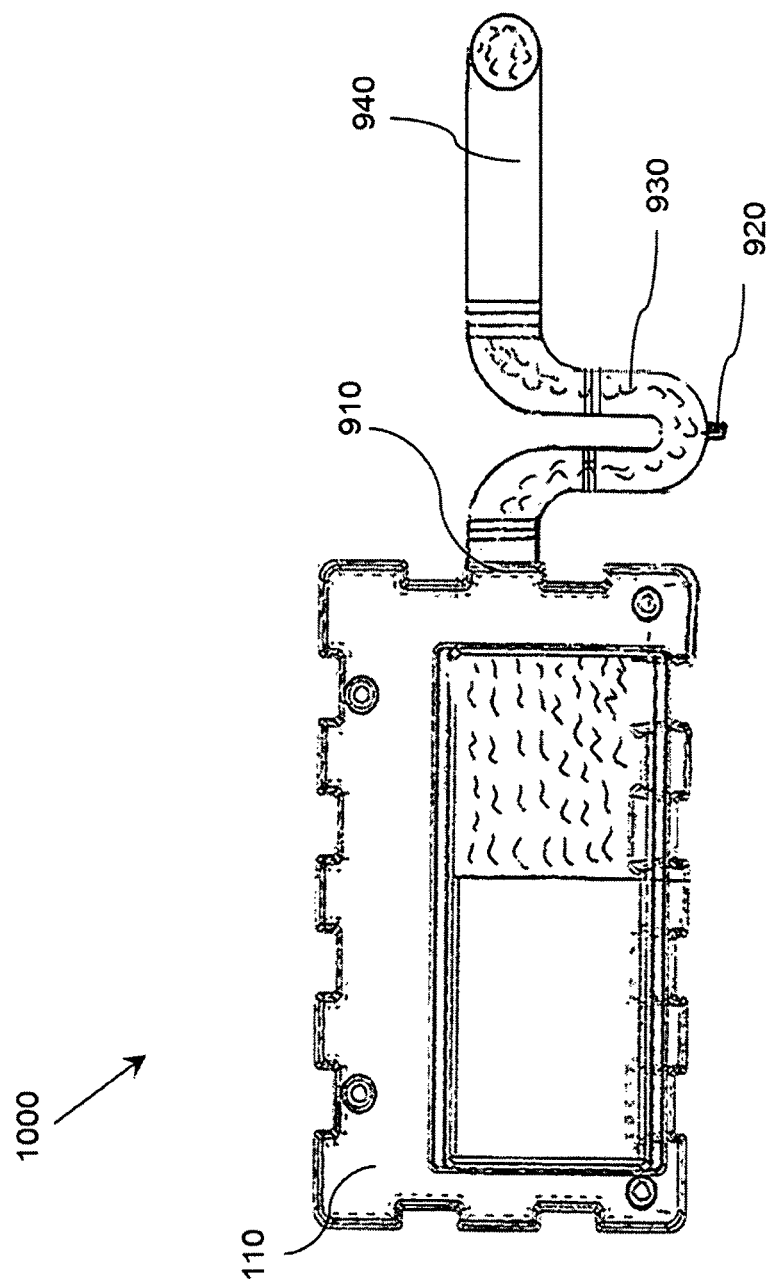
FIG. 10 illustrates a top view of human waste over flow control system, in accordance with an embodiment of the invention.

In accordance with embodiment of the invention, the reverse U-shaped bend (930) is having a lever (920) capable of tilting the reverse U-shaped bend (930) to an angle of 90 degree, when pulled. FIG. 10 illustrates a top view (1000) of human waste over flow control system (900), in accordance with an embodiment of the invention. As shown in FIG. 10, the tilting of the U-shaped bend (930) at an angle of 90 degree allows the movement of the human waste from the reservoir (110) to the underground tank (950). The tilting of reverse U-shaped bend (930) allows the content of the reservoir (110) to move towards the underground tank through the drain pipe (940). In accordance with embodiment of the invention, the level of reservoir (110) is higher than that of the underground tank (950). The higher level of reservoir (110) allows easy seepage of human waste into underground tank (950) through the drain pipe (940). In one embodiment of the present invention, the drain pipe (940) is provided a slope that inclines the drain pipe and provides an easy flow to the human waste from the reservoir (110) to the underground tank (950).

Further, when the reverse U-shaped (930) is in horizontal position (as shown in FIG. 9), the human waste is confined inside the reservoir (110) only. But when the reverse U-shaped bend (930) is tilted at an angle of 90 degree (as shown in FIG. 10) the mixture moves towards the underground due to open passage to the mixture. In accordance with an embodiment of the invention, the overflow control system (900) controls the level of the human waste mixture in the reservoir (110) and avoids its overflow into the toilet cabin (160). Further, the reverse U-shaped bend (930) is flexibly coupled with the drain pipe (940) with two 90 degree elbows bends. The flexible coupling allows tilting of the reverse U-shaped bend (930) to 90 degree. Further, the flexible coupling allows easy maintenance and repair of the drain pipe (940). Further, the system (900) is capable of flushing the human waste from the reservoir (110) to the underground tank (950) and is independent of size of the reservoir (110).

In accordance with embodiment of the invention, the underground tank (950) is one of, but not limited to a sewage tank, a composting infrastructure and an underground dumping site. In accordance with embodiment of the invention, the human waste is allows to store in underground tank such that it can be used for manure and fertilizer purposes.

Figure 11:
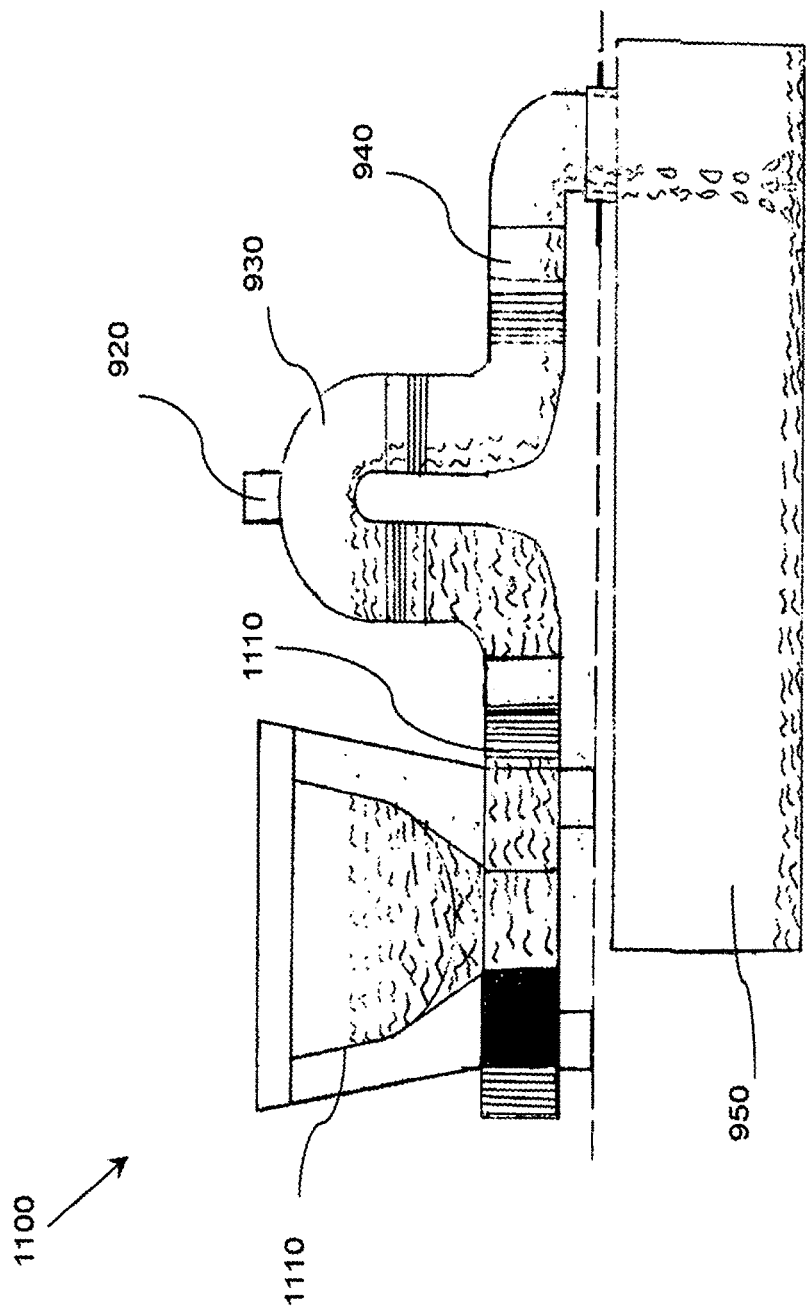
FIG. 11 illustrates a side view of human waste overflow control system connected with the modern toilet, in accordance with an embodiment of the invention.

In accordance with another embodiment of the invention, the human waste overflow control system (900) is connected to the outlet (1120) of modern toilets for preventing its overflow and to allow flushing of the human waste. FIG. 11 illustrates a side view (1100) of overflow control system (900) connected with outlet (1120) of the modern toilet (1110), in accordance with an embodiment of the invention. Further, the overflow control system (900) prevents the overflow of the modern toilet (1100) and allows flushing of the waste without any requirement of water.

Figure 12:
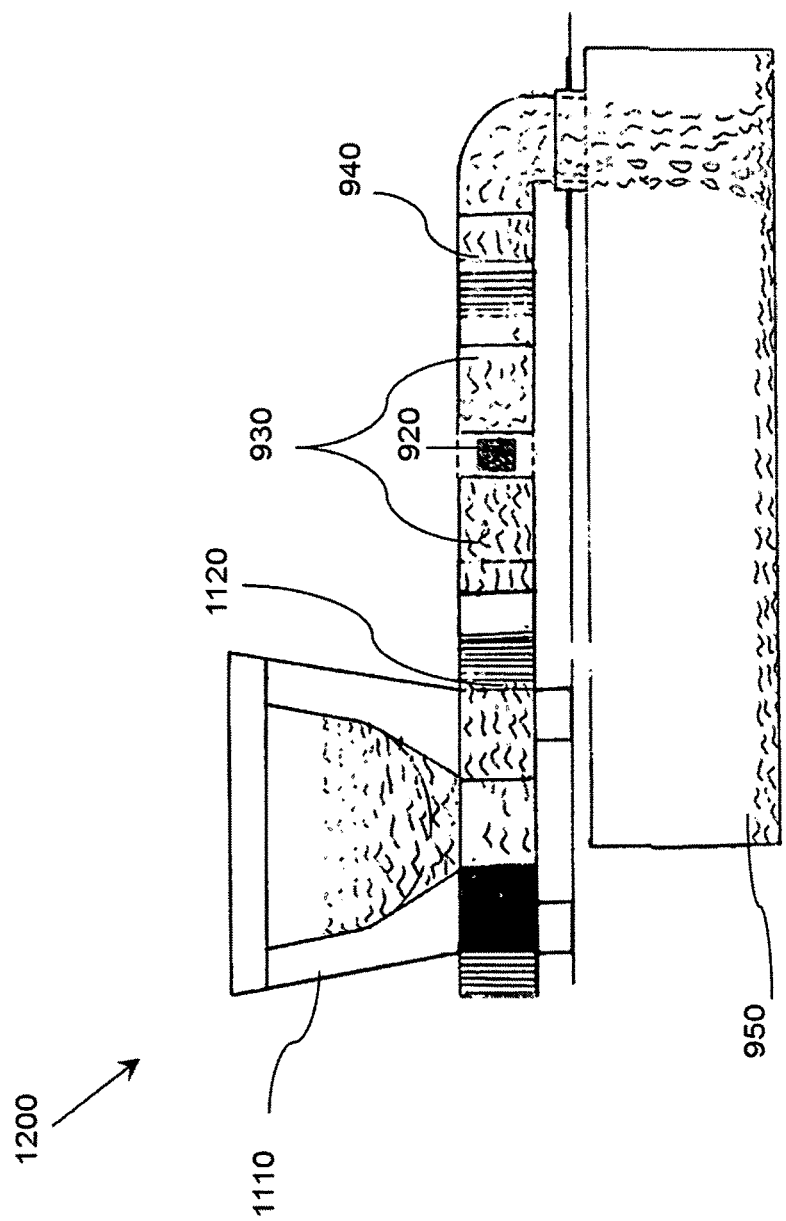
FIG. 12 illustrates a side view of human water overflow control system connected with outlet of the modern toilet, in accordance with embodiment of the invention

FIG. 12 illustrates a side view (1200) of human water overflow control system (900) connected with outlet (1120) of the modern toilet (1110), in accordance with embodiment of the invention. As shown in FIG. 12, the position of handle (920) is shifted that allows the human waste to flush in to the underground tanks (950), through the reverse U-shaped bend (930).

In accordance with one embodiment of the invention, the human waste overflow control system (900) is connected to outlet of dry toilets having no availability of water. In one another embodiment, the system (900) is connected to the modern toilet (1110) with availability of water. The system is capable of consuming at least 50 percent less water as compared to water used by normal modern toilet having water based flushing system.

Further, the human waste overflow control system (900) allows easy and quick cleaning of portable toilet (100). Further, in traditional chemical based portable toilets a vacuum system is required to clean the toilet. Further, the use of the toilet is not allowed at the time of cleaning. Further it takes hours to clean the portable toilets using the vacuum system and is a cumbersome task. In accordance with embodiment of the invention, the present system (900) takes very less time to flush out the human waste. Further, in one embodiment it takes only 15 seconds to flush out the human waste.

The portable toilet (100) described through various embodiments above have number of other advantages such as the blocking the view of the human waste while entering inside the toilet cabin (160). Further, providing an efficient and innovative ventilation system that improves the environment of the portable toilet (100) by directing the bad smell of the human waste away from the toilet cabin.

Further, the portable toilet (100) is sealed and does not allow any human waste smell to linger around the toilet cabin. This provides the portable toilet (100) with a healthy and hygienic environment inside the toilet cabin (160). Further, in the portable toilet (160) no water is used and even no usage of harmful chemicals for disinfecting the human waste reservoir is required.

The design of portable toilet (100) provides same level of comfort and convenience as using a modern toilet. Further, the portable toilet (100) works in both ways as a simple men's urinal for liquid waste clearance and even for solid waste clearance. The portable toilet (100) will prove very helpful for using in remote location outdoor events, mountains, roadsides and temporary settlements etc. Further, the human waste overflow control system increases the storage capacity of the portable toilet (700). The system allows the usage of portable toilet (100) for longer duration by a mass crowd without daily maintenance regardless the number of users.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

I claim:

1. A portable toilet, comprising:
a reservoir;
a reservoir cover adjustably fixed on a top of the reservoir; and
a drawer inside the reservoir;
wherein the reservoir cover has a hole, a first cavity and a second cavity;
wherein the reservoir is adapted to receive human waste from the hole provided on the reservoir cover;
wherein the drawer contains a handle, the handle is capable of moving in the first cavity of the reservoir cover and consequently moves the drawer inside the reservoir from a first position to a second position;
wherein the movement of the drawer blocks a view of the human waste inside the reservoir through the hole;
wherein the second cavity is having an exhaust pipe connected to a roof of a toilet cabin, adapted to provide a ventilation inside the reservoir and capable of directing bad smell of the human waste out of the toilet cabin.

2. The portable toilet as claimed in claim 1, wherein the reservoir further comprises a shielding plate capable of blocking the view of the human waste inside the reservoir through the first cavity.

3. The portable toilet as claimed in claim 1, wherein the reservoir cover further comprises one or more sections protruding downward along a periphery of the hole of the portable toilet.

4. The portable toilet as claimed in claim 3, wherein the one or more sections are capable of blocking the view of the human waste inside the reservoir through the hole of the portable toilet.

5. The portable toilet as claimed in claim 4, wherein the one or more sections are capable of sweeping accidental spill of the human waste on the drawer and dropping the human waste in the reservoir when the drawer is moved from the first position to the second position.

6. The portable toilet as claimed in claim 1, wherein the reservoir cover further comprises a depression around a periphery of the hole, capable of holding a seat cover of the portable toilet.

7. The portable toilet as claimed in claim 6, wherein the seat cover is capable of accommodating a user on the seat cover.

8. The portable toilet as claimed in claim 1, wherein the drawer is provided a sliding mechanism capable of moving the drawer from the first position to the second position.

9. The portable toilet as claimed in claim 1, wherein in the first position, the drawer is below the hole so that the reservoir is configured to receive liquid waste in a form of urine and in the second position the drawer is below the first cavity so that the reservoir is configured to receive solid waste.

10. The portable toilet as claimed in claim 1, wherein the drawer and the handle are on either side of the hole.

11. The portable toilet as claimed in claim 1, wherein the reservoir further comprises an extended stair portion adapted to further increase capacity of reservoir.

12. The portable toilet as claimed in claim 1, further comprising an exhaust fan connected to the exhaust pipe.

13. The portable toilet as claimed in claim 1, further comprising a plurality of sensors capable of sensing a user inside the toilet cabin.

14. The portable toilet as claimed in claim 13, wherein the plurality of sensors are adapted to switch on an exhaust fan on sensing the user inside the toilet cabin.

* * * * *